US008583440B2

(12) United States Patent
Stephanick et al.

(10) Patent No.: US 8,583,440 B2
(45) Date of Patent: Nov. 12, 2013

(54) APPARATUS AND METHOD FOR PROVIDING VISUAL INDICATION OF CHARACTER AMBIGUITY DURING TEXT ENTRY

(75) Inventors: James Stephanick, Seattle, WA (US);
Ethan R. Bradford, Seattle, WA (US);
Pim Van Meurs, Kenmore, WA (US);
Richard Eyraud, Seattle, WA (US);
Michael R. Longé, Seattle, WA (US)

(73) Assignee: Tegic Communications, Inc., Seattle, WA (US)

( * ) Notice: Subject to any disclaimer, the term of this patent is extended or adjusted under 35 U.S.C. 154(b) by 1049 days.

(21) Appl. No.: 11/213,131

(22) Filed: Aug. 26, 2005

(65) Prior Publication Data

US 2005/0283358 A1    Dec. 22, 2005

Related U.S. Application Data

(63) Continuation-in-part of application No. 10/176,933, filed on Jun. 20, 2002.

(60) Provisional application No. 60/625,378, filed on Nov. 5, 2004.

(51) Int. Cl.
| | | |
|---|---|---|
| G06F 17/20 | (2006.01) | |
| G06F 17/28 | (2006.01) | |
| G06F 17/27 | (2006.01) | |
| G06F 3/00 | (2006.01) | |
| G06F 3/033 | (2013.01) | |
| G09G 5/00 | (2006.01) | |

(52) U.S. Cl.
USPC ............. 704/270; 704/7; 345/619; 345/689; 345/169

(58) Field of Classification Search
USPC .......... 704/1–9, 270, 277; 707/1–5; 345/619, 345/689, 168–169; 715/200–201, 204, 221, 715/224, 700, 703
See application file for complete search history.

(56) References Cited

U.S. PATENT DOCUMENTS

| 3,967,273 A | 6/1976 | Knowlton |
| 4,164,025 A | 8/1979 | Dubnowski et al. |

(Continued)

FOREIGN PATENT DOCUMENTS

| EP | 0313975 | 5/1989 |
| EP | 0319193 | 6/1989 |

(Continued)

OTHER PUBLICATIONS

Ajioka, Y. Anzai, Y. "Prediction of Nexet Alphabets and Words of Four Sentences by Adaptive Injunctions" IJCNN-91-Seattle: Int'l Joint Conference on Neural Networks (Cat. No. 91CH3049-4) p. 897, vol. 2; IEEE, NY, NY 1991 USA.

(Continued)

Primary Examiner — Pierre-Louis Desir
Assistant Examiner — David Kovacek
(74) Attorney, Agent, or Firm — Michael A. Glenn; Perkins Coie LLP (57) ABSTRACT

An apparatus and method for providing visual indication of character ambiguity and ensuing reduction of such ambiguity during text entry are described. An application text entry field is presented in a display screen, into which the user enters text by means of a reduced keyboard and a disambiguating system. The default or most likely word construct for the current key sequence may be presented at the insertion point of the text entry field. An indication of ambiguity is presented in the display screen to communicate to the user the possible ambiguous characters associated with each key. A word choice list field may also be present to display at least one word construct matching the current key sequence.

7 Claims, 7 Drawing Sheets

(56) References Cited

U.S. PATENT DOCUMENTS

| | | |
|---|---|---|
| 4,191,854 A | 3/1980 | Coles |
| 4,339,806 A | 7/1982 | Yoshida |
| 4,360,892 A | 11/1982 | Endfield |
| 4,396,992 A | 8/1983 | Hayashi et al. |
| 4,427,848 A | 1/1984 | Tsakanikas |
| 4,442,506 A | 4/1984 | Endfield |
| 4,464,070 A | 8/1984 | Hanft et al. |
| 4,481,508 A | 11/1984 | Kamei et al. |
| 4,544,276 A | 10/1985 | Horodeck |
| 4,586,160 A | 4/1986 | Amano et al. |
| 4,649,563 A | 3/1987 | Riskin |
| 4,661,916 A | 4/1987 | Baker et al. |
| 4,669,901 A | 6/1987 | Feng |
| 4,674,112 A | 6/1987 | Kondraske et al. |
| 4,677,659 A | 6/1987 | Dargan |
| 4,679,951 A * | 7/1987 | King et al. ............. 400/110 |
| 4,744,050 A | 5/1988 | Hirosawa et al. |
| 4,754,474 A | 6/1988 | Feinson |
| RE32,773 E | 10/1988 | Goldwasser et al. |
| 4,791,556 A | 12/1988 | Vilkaitis |
| 4,807,181 A | 2/1989 | Duncan, IV et al. |
| 4,817,129 A | 3/1989 | Riskin |
| 4,866,759 A | 9/1989 | Riskin |
| 4,872,196 A | 10/1989 | Royer et al. |
| 4,891,786 A | 1/1990 | Goldwasser |
| 4,969,097 A | 11/1990 | Levin |
| 5,018,201 A | 5/1991 | Sugawara |
| 5,031,206 A | 7/1991 | Riskin |
| 5,041,967 A | 8/1991 | Ephrath et al. |
| 5,067,103 A | 11/1991 | Lapeyre |
| 5,109,352 A | 4/1992 | O'Dell |
| 5,128,672 A * | 7/1992 | Kaehler ............. 341/23 |
| 5,131,045 A | 7/1992 | Roth |
| 5,133,012 A | 7/1992 | Nitta |
| 5,163,084 A | 11/1992 | Kim et al. |
| 5,200,988 A | 4/1993 | Riskin |
| 5,210,689 A * | 5/1993 | Baker et al. ............. 704/1 |
| 5,218,538 A | 6/1993 | Zhang |
| 5,229,936 A | 7/1993 | Decker et al. |
| 5,255,310 A | 10/1993 | Kim et al. |
| 5,258,748 A | 11/1993 | Jones |
| 5,288,158 A * | 2/1994 | Matias ............. 400/472 |
| 5,289,394 A | 2/1994 | Lapeyre |
| 5,303,299 A | 4/1994 | Hunt et al. |
| 5,305,205 A | 4/1994 | Weber et al. |
| 5,339,358 A | 8/1994 | Danish et al. |
| 5,371,851 A | 12/1994 | Pieper et al. |
| 5,388,061 A | 2/1995 | Hankes |
| 5,392,338 A | 2/1995 | Danish et al. |
| 5,535,421 A | 7/1996 | Weinreich |
| 5,559,512 A | 9/1996 | Jasinski et al. |
| 5,642,522 A | 6/1997 | Zaenen et al. |
| 5,664,896 A | 9/1997 | Blumberg |
| 5,680,511 A | 10/1997 | Baker et al. |
| 5,748,512 A | 5/1998 | Vargas |
| 5,786,776 A | 7/1998 | Kisaichi et al. |
| 5,797,098 A | 8/1998 | Schroeder et al. |
| 5,805,911 A | 9/1998 | Miller |
| 5,818,437 A | 10/1998 | Grover et al. |
| 5,825,353 A | 10/1998 | Will |
| 5,828,991 A | 10/1998 | Skiena et al. |
| 5,847,697 A | 12/1998 | Sugimoto |
| 5,855,000 A | 12/1998 | Waibel et al. |
| 5,896,321 A | 4/1999 | Miller et al. |
| 5,917,890 A | 6/1999 | Brotman et al. |
| 5,917,941 A | 6/1999 | Webb et al. |
| 5,926,566 A | 7/1999 | Wang et al. |
| 5,936,556 A | 8/1999 | Sakita |
| 5,937,380 A | 8/1999 | Segan |
| 5,937,422 A | 8/1999 | Nelson et al. |
| 5,945,928 A | 8/1999 | Kushler et al. |
| 5,952,942 A | 9/1999 | Balakrishnan et al. |
| 5,953,541 A | 9/1999 | King et al. |
| 5,960,385 A * | 9/1999 | Skiena et al. ............. 704/9 |
| 5,963,671 A | 10/1999 | Comerford et al. |
| 5,999,950 A | 12/1999 | Krueger et al. |
| 6,005,498 A | 12/1999 | Yang et al. |
| 6,009,444 A | 12/1999 | Chen |
| 6,011,554 A | 1/2000 | King et al. |
| 6,041,323 A * | 3/2000 | Kubota ............. 707/5 |
| 6,044,347 A | 3/2000 | Abella et al. |
| 6,054,941 A | 4/2000 | Chen |
| 6,073,101 A | 6/2000 | Maes |
| 6,098,086 A | 8/2000 | Krueger et al. |
| 6,104,317 A | 8/2000 | Panagrossi |
| 6,120,297 A | 9/2000 | Morse, III et al. |
| 6,130,628 A | 10/2000 | Schneider-Hufschmidt et al. |
| 6,169,538 B1 | 1/2001 | Nowlan et al. |
| 6,172,625 B1 | 1/2001 | Jin et al. |
| 6,178,401 B1 | 1/2001 | Franz et al. |
| 6,204,848 B1 | 3/2001 | Nowlan et al. |
| 6,208,966 B1 | 3/2001 | Bulfer |
| 6,219,731 B1 | 4/2001 | Gutowitz |
| 6,223,059 B1 | 4/2001 | Haestrup |
| 6,246,761 B1 | 6/2001 | Cuddy |
| 6,286,064 B1 | 9/2001 | King et al. |
| 6,304,844 B1 | 10/2001 | Pan et al. |
| 6,307,548 B1 | 10/2001 | Flinchem et al. |
| 6,307,549 B1 | 10/2001 | King et al. |
| 6,346,894 B1 * | 2/2002 | Connolly et al. ............. 341/22 |
| 6,362,752 B1 | 3/2002 | Guo et al. |
| 6,363,347 B1 | 3/2002 | Rozak |
| 6,377,965 B1 | 4/2002 | Hachamovitch et al. |
| 6,392,640 B1 | 5/2002 | Will |
| 6,421,672 B1 | 7/2002 | McAllister et al. |
| 6,424,743 B1 | 7/2002 | Ebrahimi |
| 6,466,232 B1 | 10/2002 | Newell et al. |
| 6,502,118 B1 | 12/2002 | Chatterjee |
| 6,542,170 B1 | 4/2003 | Williams et al. |
| 6,559,778 B1 | 5/2003 | Hillmering |
| 6,567,075 B1 | 5/2003 | Baker et al. |
| 6,574,597 B1 | 6/2003 | Mohri et al. |
| 6,584,179 B1 | 6/2003 | Fortier et al. |
| 6,633,846 B1 | 10/2003 | Bennett et al. |
| 6,636,162 B1 | 10/2003 | Kushler et al. |
| 6,646,573 B1 | 11/2003 | Kushler et al. |
| 6,665,640 B1 | 12/2003 | Bennett et al. |
| 6,684,185 B1 | 1/2004 | Junqua et al. |
| 6,686,852 B1 | 2/2004 | Guo |
| 6,711,290 B2 | 3/2004 | Sparr et al. |
| 6,728,348 B2 | 4/2004 | Denenberg et al. |
| 6,734,881 B1 | 5/2004 | Will |
| 6,738,952 B1 | 5/2004 | Yamamuro |
| 6,751,605 B2 * | 6/2004 | Gunji et al. ............. 707/1 |
| 6,757,544 B2 | 6/2004 | Rangarajan et al. |
| 6,801,190 B1 | 10/2004 | Robinson et al. |
| 6,801,659 B1 | 10/2004 | O'Dell |
| 6,807,529 B2 | 10/2004 | Johnson et al. |
| 6,864,809 B2 | 3/2005 | O'Dell et al. |
| 6,885,317 B1 | 4/2005 | Gutowitz |
| 6,912,581 B2 | 6/2005 | Johnson et al. |
| 6,920,420 B2 | 7/2005 | Lin |
| 6,934,564 B2 | 8/2005 | Laukkanen et al. |
| 6,947,771 B2 | 9/2005 | Guo et al. |
| 6,955,602 B2 | 10/2005 | Williams |
| 6,956,968 B1 | 10/2005 | O'Dell et al. |
| 6,973,332 B2 | 12/2005 | Mirkin et al. |
| 6,982,658 B2 | 1/2006 | Guo |
| 6,985,933 B1 | 1/2006 | Singhal et al. |
| 7,006,820 B1 | 2/2006 | Parket et al. |
| 7,013,258 B1 * | 3/2006 | Su et al. ............. 704/1 |
| 7,020,587 B1 | 3/2006 | Chen |
| 7,027,976 B1 * | 4/2006 | Sites ............. 704/10 |
| 7,030,863 B2 | 4/2006 | Longe |
| 7,057,607 B2 | 6/2006 | Mayoraz et al. |
| 7,061,403 B2 | 6/2006 | Fux |
| 7,075,520 B2 | 7/2006 | Williams |
| 7,095,403 B2 | 8/2006 | Lyustin et al. |
| 7,098,896 B2 * | 8/2006 | Kushler et al. ............. 345/168 |
| 7,139,430 B2 | 11/2006 | Sparr et al. |
| 7,152,213 B2 | 12/2006 | Pu et al. |
| 7,224,292 B2 * | 5/2007 | Lazaridis et al. ............. 341/22 |
| 7,256,769 B2 | 8/2007 | Pun et al. |
| 7,257,528 B1 | 8/2007 | Ritchie et al. |

(56) References Cited

U.S. PATENT DOCUMENTS

| | | | |
|---|---|---|---|
| 7,272,564 B2 | 9/2007 | Phillips et al. | |
| 7,313,277 B2 | 12/2007 | Morwing et al. | |
| 7,349,576 B2 | 3/2008 | Hotsberg | |
| 7,386,454 B2 | 6/2008 | Gopinath et al. | |
| 7,389,235 B2 | 6/2008 | Dvorak | |
| 7,395,203 B2* | 7/2008 | Wu et al. | 704/235 |
| 7,437,001 B2 | 10/2008 | Morwing et al. | |
| 7,466,859 B2 | 12/2008 | Chang et al. | |
| 7,598,890 B2 | 10/2009 | Park et al. | |
| 7,626,574 B2 | 12/2009 | Kim | |
| 7,679,534 B2 | 3/2010 | Kay et al. | |
| 7,881,936 B2 | 2/2011 | Longe et al. | |
| 8,095,364 B2 | 1/2012 | Longe et al. | |
| 2001/0040517 A1* | 11/2001 | Kisaichi et al. | 341/22 |
| 2002/0019731 A1* | 2/2002 | Masui et al. | 704/7 |
| 2002/0038207 A1 | 3/2002 | Mori et al. | |
| 2002/0072395 A1 | 6/2002 | Miramontes | |
| 2002/0097227 A1* | 7/2002 | Chu et al. | 345/168 |
| 2002/0119788 A1 | 8/2002 | Parupudi et al. | |
| 2002/0126097 A1* | 9/2002 | Savolainen | 345/168 |
| 2002/0135499 A1 | 9/2002 | Guo | |
| 2002/0145587 A1 | 10/2002 | Watanabe | |
| 2002/0152075 A1 | 10/2002 | Kung et al. | |
| 2002/0188448 A1 | 12/2002 | Goodman et al. | |
| 2002/0196163 A1 | 12/2002 | Bradford et al. | |
| 2003/0011574 A1 | 1/2003 | Goodman | |
| 2003/0023420 A1 | 1/2003 | Goodman | |
| 2003/0023426 A1 | 1/2003 | Pun et al. | |
| 2003/0036411 A1 | 2/2003 | Kraft | |
| 2003/0054830 A1 | 3/2003 | Williams et al. | |
| 2003/0078038 A1 | 4/2003 | Kurosawa et al. | |
| 2003/0088398 A1* | 5/2003 | Guo et al. | 704/8 |
| 2003/0095102 A1 | 5/2003 | Kraft et al. | |
| 2003/0101060 A1 | 5/2003 | Bickley | |
| 2003/0104839 A1 | 6/2003 | Kraft et al. | |
| 2003/0119561 A1 | 6/2003 | Hatch et al. | |
| 2003/0144830 A1 | 7/2003 | Williams | |
| 2003/0179930 A1 | 9/2003 | O'Dell et al. | |
| 2003/0193478 A1 | 10/2003 | Ng | |
| 2003/0212563 A1 | 11/2003 | Ju et al. | |
| 2004/0049388 A1 | 3/2004 | Roth et al. | |
| 2004/0052355 A1 | 3/2004 | Awada et al. | |
| 2004/0067762 A1 | 4/2004 | Balle | |
| 2004/0104896 A1* | 6/2004 | Suraqui | 345/168 |
| 2004/0127197 A1 | 7/2004 | Roskind | |
| 2004/0127198 A1 | 7/2004 | Roskind et al. | |
| 2004/0135774 A1 | 7/2004 | La Monica | |
| 2004/0153963 A1 | 8/2004 | Simpson et al. | |
| 2004/0153975 A1 | 8/2004 | Williams et al. | |
| 2004/0155869 A1 | 8/2004 | Robinson et al. | |
| 2004/0163032 A1 | 8/2004 | Guo et al. | |
| 2004/0169635 A1 | 9/2004 | Ghassabian | |
| 2004/0201607 A1 | 10/2004 | Mulvey et al. | |
| 2004/0203656 A1 | 10/2004 | Andrew et al. | |
| 2004/0243257 A1 | 12/2004 | Theimer | |
| 2004/0259598 A1 | 12/2004 | Wagner et al. | |
| 2005/0017954 A1 | 1/2005 | Kay et al. | |
| 2005/0114770 A1 | 5/2005 | Sacher et al. | |
| 2006/0007162 A1* | 1/2006 | Kato | 345/168 |
| 2006/0010206 A1 | 1/2006 | Apacible et al. | |
| 2006/0028450 A1* | 2/2006 | Suraqui | 345/169 |
| 2006/0129928 A1 | 6/2006 | Qiu | |
| 2006/0136408 A1 | 6/2006 | Weir et al. | |
| 2006/0155536 A1 | 7/2006 | Williams et al. | |
| 2006/0158436 A1 | 7/2006 | LaPointe et al. | |
| 2006/0173807 A1 | 8/2006 | Weir et al. | |
| 2006/0190822 A1 | 8/2006 | Basson et al. | |
| 2006/0193519 A1 | 8/2006 | Sternby | |
| 2006/0236239 A1 | 10/2006 | Simpson et al. | |
| 2006/0239560 A1 | 10/2006 | Sternby | |
| 2007/0094718 A1 | 4/2007 | Simpson | |
| 2007/0203879 A1 | 8/2007 | Templeton-Steadman et al. | |
| 2007/0276814 A1 | 11/2007 | Williams | |
| 2007/0285397 A1 | 12/2007 | LaPointe et al. | |
| 2008/0130996 A1 | 6/2008 | Sternby | |

FOREIGN PATENT DOCUMENTS

| | | |
|---|---|---|
| EP | 0464726 | 1/1992 |
| EP | 0540147 | 5/1993 |
| EP | 0651315 | 5/1995 |
| EP | 0660216 | 6/1995 |
| EP | 0732646 | 9/1996 |
| EP | 0751469 | 1/1997 |
| EP | 1031913 | 8/2000 |
| EP | 1035712 | 9/2000 |
| EP | 1256875 | 11/2002 |
| EP | 1296216 | 3/2003 |
| EP | 1320023 | 6/2003 |
| EP | 1324573 | 7/2003 |
| EP | 1341156 | 9/2003 |
| EP | 1347361 | 9/2003 |
| EP | 1347362 | 9/2003 |
| EP | 1522920 | 4/2005 |
| GB | 2298166 | 8/1996 |
| GB | 2383459 | 6/2003 |
| JP | 61-282965 | 12/1986 |
| JP | A 1990-117218 | 5/1990 |
| JP | 03-141460 | 6/1991 |
| JP | A 1993-265682 | 10/1993 |
| JP | 8006939 | 1/1996 |
| JP | A 1997-114817 | 5/1997 |
| JP | A 1997-212503 | 8/1997 |
| JP | 11-312046 | 11/1999 |
| JP | 2000-508093 | 6/2000 |
| JP | 2001509290 | 7/2001 |
| JP | 2001-224075 | 8/2001 |
| JP | 2001-251395 | 9/2001 |
| JP | 2002-014956 | 1/2002 |
| JP | 2002-141996 | 5/2002 |
| JP | A 2002-351862 | 12/2002 |
| JP | 2003-116179 | 4/2003 |
| JP | 2003-196273 | 7/2003 |
| TW | 476033 | 2/2002 |
| TW | 559783 | 11/2003 |
| WO | WO82/00442 | 2/1982 |
| WO | WO90/07149 | 6/1990 |
| WO | WO96/27947 | 9/1996 |
| WO | WO97/04580 | 2/1997 |
| WO | WO97/05541 | 2/1997 |
| WO | WO-9833111 | 7/1998 |
| WO | WO 0035091 | 6/2000 |
| WO | WO03/058420 | 7/2003 |
| WO | WO03/060451 | 7/2003 |
| WO | WO2004003721 | 1/2004 |
| WO | WO2004110040 | 12/2004 |
| WO | WO2006/026908 | 3/2006 |

OTHER PUBLICATIONS

Martin, T.Azvine, B., "Learning User Models for an Intelligent Telephone Assistant"; Proceedings Joint $9^{th}$ IFSA World Congress and $20^{th}$ NAFIPS Intnl. Conf. (Cat. No. 01TH8569) Part vol. 2, p. 669-74 vol. 2; IEEE 2001, Piscataway, NJ, USA.

Yang, Y., Pedersen, J., "A Comparative Study on Feature Selection in Text Categorization"; 1997; Proceedings of ICML'1997, pp. 412-420.

Kronlid, F., Nilsson, V. "TreePredict, Improving Text Entry on PDA's"; 2001; Proceedings of the Conference on Human Factors in Computing Systems (CHI2001), ACM press, pp. 441-442.

Zernik, U., "Language Acquisition: Coping with Lexical Gaps", Aug. 22-27, 1998; Proceedings of the 12th International Conference on Computational Linguistics, Budapest, Hungary. pp. 796-800.

Gavalda, M. "Epiphenomenal Grammar Acquisition with GSG"; May 2000; Proceedings of the Workshop on Conversational Systems of the 6th Conf. on Applied Natural Language Processing and the 1st Conf. of the N. American Chapter of the Assoc. for Computational Linguistics (ANLP/NAACL-2000), Seattle, Washington.

Cockburn, A., Siresena, "Evaluating Mobile Text Entry with Fastap™ Keyboard"; 2003; People and Computers XVII (vol. 2): British Computer Society Conference on Human Computer Interaction. Bath, England. pp. 77-80.

(56) References Cited

OTHER PUBLICATIONS

Butts, L., Cockburn, A., "An Evaluation of Mobile Phone Text Input Methods", University of Canterbury, Dept of Computer Science, Christchurch, New Zealand AUIC2002, Melbourne Australia, Conferences in Research and Practice in Information Technology, vol. 7; Copyright 2001, Australian Computer Society.

Shieber, S., Baker, E., "Abbreviated Text Input", Harvard University, Cambridge, MA, USA shieber@deas.harvard.edu ellie@eecs.harvard.edu; IUI'03, Jan. 12-15, 2003, ACM 1-58113-586-06/03/0001.

Rosa, J. "Next Word Prediction in a Connectional Distributed Representation System"; 2002 IEEEE Intnl Conference on Systems, man and Cybernetics; Conf. Proceedings (Cat. No. 02CH37349) Part vol. 3, p. 6, Yasmine Hammamet, Tunisia, Oct. 2002.

Rosa, J., "A Biologically Motivated Connectionist System for Predicting the Next Word in Natural Language Sentences", 2002 IEEEE Intnl Conference on Systems, man and Cybernetics; Conf. Proceedings (Cat. No. 02CH37349) Part vol. 4, p. 6, Yasmine Hammamet, Tunisia, Oct. 2002.

Masui, "POBox: An efficient Text input Method for Handheld and Ubiquitous Computers"; Sony Computer Science Labs inc. Mar. 14, 2013 Higashi-Gotanda, Shinagawa Tokyo 141-0022, Japan.

Swiffin, A.L., et al., "PAL: An Effort Efficient Portable Communication Aid and Keyboard Emulator," RESNA 8th Annual Conference, Memphis, Tennessee, 1985, pp. 197, 199.

Witten, I.H., Principles of Computer Speech, New York: Academic Press, (1982), pp. 246-253.

Dey, A.K. and Abowd, G. D. (1999). Towards a better understanding of context and context-awareness. GVU Technical Report GIT-GVU-99-2, GVU Center, 1999.

Coppola, P. et al, Mobe: a framework for context-aware mobile applications. In: Proc. of Workshop on Context Awareness for Proactive Systems (CAPS2005), Helsinki University Press, 2005; ISBN:952-10-2518-2.

Schmidt, A. et al; Advanced Interaction in Context, In Proceedings of First International Symposium of Handheld and Ubiquitous Computing, pp. 89-101, Karlsruhe, Germany, Sep. 1999.

Siewiorek, D.P., et al, SenSay: A context-aware mobile phone. In proceedings of the 7th International Symposium on Wearable Computers, pp. 248-249, IEEE Press, 2003.

Motorola Lexicus Technologies & SOK's iTAP page; Sep. 2002, retrieved from: www.motorola.com/lexicus/html/itap_FAQ.html.

MacKenzie, et al; "Text Entry for Mobile Computing: Models and Methods, Theory and Practice";Sep. 2002; retrieved from website www.yorku.ca/mack/hci3.html.

Arnott, J.L., et al; *Probabilistic Character Disambiguation for Reduced Keyboards Using Small Text Samples*; Dept. Math & comp. Sci.; Univ of Dundee, Dundee, Tayside, Scotland; AAC Augmentative and Alternative Communication ; vol. 8, Sep. 1992; Copyright 1992 by ISAAC.

Demasco, Patrick W., et al., "Generating Text From Compressed Input: An Intelligent Interface for People with Sever Motor Impairments", Communications of the ACM, vol. 35 No. 5, May 1992, pp. 68-78.

James, Christina L., et al., "Text Input for Mobile Devices: Comparing Model Prediction to Actual Performance", SIGCHI '01, Seattle, WA, Mar. 31-Apr. 4, 2001, pp. 365-371 [ACM 1-58113-327-8/01/0003].

MacKenzie, I. Scott, et al., "LetterWise: Prefix-based Disambiguation for Mobile Text Input", UIST '01, Orlando, FL, Nov. 11-14, 2001, pp. 111-120 [ACM 1-58113-438-x/01/11].

Levine, S.H., et al., "Multi-Character Key Text Entry Using Computer Disambiguation," RESNA 10th Annual Conference, San Jose, California, 1987, pp. 177-178.

Xu, Jinxi, et al., "Corpus-Based Stemming Using Cooccurrence of Word Variants", ACM Transactions on Information Systems, vol. 16 No. 1, Jan. 1998, pp. 61-81 [ACM 1046-8188/98/0100-0061].

Press Release from Tegic Communications, "America Online, Inc. Acquires Tegic Communications", Dec. 1, 1999, pp. 1-3 (downloaded from: www.tegic.com/pressreleases/pr_aolacquisition.html).

News Release from Zi Corporation, "Zi Claims Second Patent Victory Against Tegic Communications, a unit of AOL Time Warner", Mar. 14, 2002, pp. 1-2 (downloaded from: www.zicorp.com/pressreleases/031402.html).

Summary Judgment Orders, *Zi Corporation, Inc.* v. *Tegic Communications, Inc.*, Mar. 13, 2002, pp. 1-7 (downloaded from: www.zicorp.com/pressreleases/031402.html).

Silfverberg, Miika, et al., "Bringing Text Input Beyond the Desktop", CHI 2000, The Hague, Amsterdam, Apr. 1-6, 2000, pp. 9-16 [ACM 1-58113-216-6/00/04].

"Latest Philips Wireless Handset Ships With T9 Text Input in China", Business Wire, Nov. 9, 1999, pp. 1-2 (downloaded from: www.businesswire.com/webbox/bx.110999/193130342.htm).

Tygran, Amalyan, "T9 or Text Predicative Input in Mobile Telephones", Business Wire, Jul. 23, 2001, pp. 1-5 (downloaded from: web.archive.org/wweb/20010723054055/http://www.digit-life.com/articles/mobilet9/).

James, Christina, et al., "Bringing Text Input Beyond the Desktop", CHI 2000, Seattle, WA, Apr. 1-6, 2000, pp. 49-50.

Kushler, Cliff, "AAC Using a Reduced Keyboard", downloaded from: www.dinf.ne.jp/doc/english/Us_Eu/conf/csun_98/csun98_140.htm, Web Posted Mar. 3, 1998, pp. 1-4.

Sugimoto, Masakatsu, "Single-Hand Input Scheme for English and Japanese Text", Fujitsu Sci. Tech.J., vol. 33 No. 2, Dec. 1997, pp. 189-195.

http://www.pinyin.info/readings/texts/ideographic_myth.html. The Ideographic Myth. 1984.

http://www.ling.upenn.edu/courses/Fall_2003/ling001/reading_writing.html. What is writing? Linguistics 001. Lecture 19. Reading and Writing 2003.

Making Multi-tap Intelligent; retrieved Feb. 7, 2006 from website: http://www.zicorp.com/ezitap.htm.

Tapless ppd Gen3.0; retrieved Feb. 7, 2006 from website: http://www.tapless.biz/.

WordLogic for Handheld Computers—http://web.archive.org/web/20051030092534/www.wordlogic.com/products-predictive-keyboard-handheld-prediction.asp ; Oct. 30, 2005; retrieved from webarchive.org.

Welcome to the Nuance Corporate Website; retrieved on Feb. 7, 2006 from website: http://www.nuance.com/.

Suhm B., et al. "Multimodal Error Correction for Speech User Interfaces" ACM Transactions on Computer-Human Interaction, vol. 8. Mar. 2001.

Oviatt,S. "Mutual Disambiguation of Recognition Errors in a Multimodal Architecture." Chi 99. May 15-29, 1999.

Foulds, R., et al. "Lexical Prediction Techniques Applied to Reduce Motor Requirements for Augmentative Communication," RESNA 10th Annula Conference, San Jose, California, 1987, pp. 115-117.

Foulds, R., et al., "Statistical Disambiguation of Multi-Character Keys Applied to Reduce Motor Requirements for Augmentative and Alternative Communication," AAC Augmentative and Alternative Communication (1987), pp. 192-195.

IBM Technical Disclosure Bulletin, "Speed Keyboard for Data Processor," vol. 23, 3 pages, Jul. 1980. IBM Corp., 1993.

Kamphuis, H., et al., "Katdas; A Small Number of Keys Direct Access System," RESNA 12th Annual Conference, New Orleans, Louisiana, 1989, pp. 278-279.

King, M.T., "JustType-Efficient Communication with Eight Keys," Proceedings of the RESNA '95 Annual Conference, Vancouver, BC, Canada, 1995, 3 pages.

Kreifeldt, J.G., et al., "Reduced Keyboard Designs Using Disambiguation," Proceedings of the Human Factors Society 33rd Annual Meeting, 1989, pp. 441-444.

Levine, S.H., "An Adaptive Approach to Optimal Keyboard Design for Nonvocal Communication," IEEE, 1985, pp. 334-337.

Levine, S.H., et al., "Adaptive Technique for Customized Interface Design With Application to Nonvocal Communication," RESNA 9th Annual Conference, Minneapolis, Minnesota, 1986, pp. 399-401.

(56) References Cited

OTHER PUBLICATIONS

Levine, S.H., et al., "Computer Disambiguation of Multi-Character Key Text Entry: An Adaptive Design Approach," IEEE, 1986, pp. 298-301.

Matias, E., et al., "Half-QWERTY: Typing With One Hand Using Your Two-Handed Skills," Conference Companion, CHI '94 (Apr. 24-28, 1994), pp. 51-52.

Minneman, S.L., "A Simplified Touch-Tone Telecommunication Aid for Deaf and Hearing Impaired Individuals," RESNA 8th Annual Conference, Memphis Tennessee, 1985, pp. 209-211.

Oommen, B.J., et al., "Correction to 'An Adaptive Learning Solution to the Keyboard Optimization Problem'." IEEE Transactions on Systems, Man and Cybernetics, vol. 22, No. 5 (Oct. 1992) pp. 1233-1243.

Smith, Sidney L., et al., "Alphabetic Data Entry Via the Touch-Tone Pad: A Comment," Human Factors, 13(2), Apr. 1971, pp. 189-190.

Sugimoto, M., et al., "SHK: Single Hand Key Card for Mobile Devices," CHI 1996 (Apr. 13-18, 1996), pp. 7-8.

Swiffin, A.L., et al., "Adaptive and Predictive Techniques in a Communications Prosthesis," AAC Augmentative and Alternative Communication, (1987), pp. 181-191.

Oommen, B. John, et al.; "String Taxonomy Using Learning Automata"; Apr. 1997; IEEE Transactions on Systems, Mand and Cybernetics—Part B: Cybernetics, vol. 27 No. 20 pp. 354-365.

Lesher, Gregory W. et al.; "Optimal Character Arrangements for Ambiguous Keyboards"; Dec. 1998; IEEE Transactions on Rehabilitation Engineering, vol. 6, No. 4, pp. 415-423.

http://pitecan.com/OpenPOBox/info/index.html; Jul. 23, 2001.

\* cited by examiner

APPARATUS AND METHOD FOR PROVIDING VISUAL INDICATION OF CHARACTER AMBIGUITY DURING TEXT ENTRY

CROSS-REFERENCE TO RELATED APPLICATIONS

This application is a Continuation-in-Part of co-pending application, U.S. Ser. No. 10/176,933, filed on Jun. 20, 2002, and entitled "EXPLICIT CHARACTER FILTERING OF AMBIGUOUS TEXT ENTRY". This co-pending application is incorporated herein in its entirety by this reference thereto. This application also claims priority from U.S. Provisional Patent Application Ser. No. 60/625,378, filed on Nov. 5, 2004, and entitled "VISUAL INDICATION OF CHARACTER AMBIGUITY AND THE ENSUING REDUCTION OF AMBIGUITY DURING (T9) TEXT ENTRY," which is also incorporated herein in its entirety by this reference thereto.

BACKGROUND OF THE INVENTION

1. Technical Field

The invention relates to text input technology. More specifically, the invention relates to text entry solutions to wireless communication devices which have limited keypads.

2. Description of the Prior Art

For many years, portable computers have been getting smaller and smaller. The principal size-limiting component in the effort to produce a smaller portable computer has been the keyboard. If standard typewriter-size keys are used, the portable computer must be at least as large as the keyboard. Miniature keyboards have been used on portable computers, but the miniature keyboard keys have been found to be too small to be easily or quickly manipulated by a user. Incorporating a full-size keyboard in a portable computer also hinders true portable use of the computer. Most portable computers cannot be operated without placing the computer on a flat work surface to allow the user to type with both hands. A user cannot easily use a portable computer while standing or moving.

Presently, a tremendous growth in the wireless industry has spawned reliable, convenient, and very popular mobile devices available to the average consumer, such as cell phones, PDAs, MP3 players, etc. Handheld wireless communications and computing devices requiring text input are becoming smaller still. Further, advances in portable wireless technologies have led to a demand for small and portable two-way messaging systems, both SMS and e-mail, and for mobile Web browsing. Wireless communications device manufacturers also desire to provide devices which the consumer can operate with the same hand that is holding the device.

Disambiguation Background

Prior development work has considered use of a keyboard that has a reduced number of keys. As suggested by the keypad layout of a touch-tone telephone, many of the reduced keyboards have used a 3-by-4 array of keys. Each key in the array of keys contains multiple characters. There is therefore ambiguity as a user enters a sequence of keys, because each keystroke may indicate one of several letters. Several approaches have been suggested for resolving the ambiguity of the keystroke sequence, referred to as disambiguation.

One suggested approach for unambiguously specifying characters entered on a reduced keyboard requires the user to enter, on average, two or more keystrokes to specify each letter. The keystrokes may be entered either simultaneously (chording) or in sequence (multiple-stroke specification). Neither chording nor multiple-stroke specification has produced a keyboard having adequate simplicity and efficiency of use. Multiple-stroke specification is inefficient, and chording is complicated to learn and use.

Other suggested approaches for determining the correct character sequence that corresponds to an ambiguous keystroke sequence are summarized in Arnott, *Probabilistic Character Disambiguation for Reduced Keyboards Using Small Text Samples*, Journal of the International Society for Augmentative and Alternative Communication Arnott and M. Y. Javad (hereinafter the "Arnott article"). The Arnott article notes that the majority of disambiguation approaches employ known statistics of character sequences in the relevant language to resolve character ambiguity in a given context. The article also references research on word-based disambiguation systems and their respective advantages and disadvantages.

T9® Text Input is the leading commercial product offering word-level disambiguation for reduced keyboards, as taught in U.S. Pat. No. 5,818,437 and subsequent patents. Ordering the ambiguous words by frequency of use reduces the efficiency problems identified by previous research, and the ability to add new words makes it even easier to use over time. Input sequences may be interpreted simultaneously as words, word stems, and/or completions, numbers, and unambiguous character strings based on stylus tap location or keying patterns, such as multi-tap.

Another commonly used keyboard for small devices consists of a touch-sensitive panel on which some type of keyboard overlay has been printed, or a touch-sensitive screen with a keyboard overlay displayed. Depending on the size and nature of the specific keyboard, either a finger or a stylus can be used to interact with the panel or display screen in the area associated with the key or letter that the user intends to activate. Due to the reduced size of many portable devices, a stylus is often used to attain sufficient accuracy in activating each intended key.

The system described in U.S. Pat. No. 6,801,190 uses word-level auto-correction to resolve the accuracy problem and permit rapid entry on small keyboards. Because tap locations are presumed to be inaccurate, there is some ambiguity as to what the user intended to type. The user is presented with one or more interpretations of each keystroke sequence corresponding to a word, such that the user can easily select the desired interpretation. This approach enables the system to use the information contained in the entire sequence of keystrokes to resolve what the user's intention was for each character of the sequence.

Handwriting recognition is another approach that has been taken to solve the text input problem on small devices that have a touch-sensitive screen or pad that detects motion of a finger or stylus. Writing on the touch-sensitive panel or display screen generates a stream of data input indicating the contact points. The handwriting recognition software analyzes the geometric characteristics of the stream of data input to determine each character or word. Due to differences in individual writing styles and the limitations of handwriting technology on mobile devices, however, recognition accuracy is less than perfect, resulting in character ambiguity even though current handwriting systems do not typically reveal that ambiguity to the user.

A Need for Improvements to Current Disambiguation Methodologies

A specific challenge facing word-based disambiguation is that of providing sufficient feedback to the user about the keystrokes being input, particularly for the novice or infrequent user who is unfamiliar with the reduced keyboard layout or the disambiguation system. With an ordinary typewriter or word processor, each keystroke represents a unique character which can be displayed to the user as soon as it is entered. But with word-level disambiguation, for example, this is often not possible, because each entry represents multiple characters, and any sequence of entries may match multiple words or word stems. The ambiguity may confuse the first-time user if the system displays characters that change as each key is pressed: the user does not know that the system offers the desired word at the end, and he may needlessly attempt to fix each character before proceeding. Ambiguity is especially a problem when, for example, the user makes a spelling or entry error and is not aware of such error until the complete sequence is entered and the desired result is not presented. Displaying word stems that match the partial sequence reduces this problem, by showing when the user is on the right track towards the desired word, but does not eliminate it entirely, especially if some stems are concealed due to display space constraints.

U.S. Pat. No. 5,818,437 describes a keystroke window (102) that displays keycap icons representing the ambiguous key sequence, which confirms that the user pressed the intended keys. But the display provides neither an explanation of how the words are being assembled from that key sequence nor feedback that the user is on the right track.

Moreover, some alphabets, such as Thai and Arabic, contain more letters than the alphabet for English, which leads to even greater ambiguity on a reduced number of keys. Efficient and confident input of these languages demands a mechanism for reducing the appearance of that ambiguity when needed.

SUMMARY OF THE INVENTION

An apparatus and method for providing visual indication of character ambiguity and ensuing reduction of such ambiguity during text entry are described. An application text entry field is presented in a display screen, into which the user enters text by means of a reduced keyboard and a disambiguating system. The default or most likely word construct for the current key sequence may be presented at the insertion point of the text entry field. An indication of ambiguity is presented in the display screen to communicate to the user the possible characters associated with each key. A word choice list field may also be present to display at least one word construct matching the current key sequence.

BRIEF DESCRIPTION OF THE DRAWINGS

FIG. 1 illustrates a succession of display screens updated to show decreasing ambiguity during text entry according to one embodiment of the invention;

FIG. 2 illustrates a succession of display screens updated to show decreasing ambiguity during text entry according to an alternate embodiment of the invention;

FIG. 3 illustrates a succession of display screens updated to show decreasing ambiguity during text entry according to another alternate embodiment of the invention;

FIG. 4 illustrates pairs of display screens updated to show indication of ambiguity during alternate word selection according to another embodiment of the invention;

FIG. 5 illustrates a succession of display screens updated to show decreasing ambiguity during text entry according to a further alternate embodiment of the invention;

FIG. 6 illustrates a succession of display screens updated to show decreasing ambiguity after explicit entry of a character according to a preferred embodiment of the invention; and FIG. 7 illustrates display screens updated to show decreasing ambiguity upon explicit entry of a character according to two embodiments of the invention.

DETAILED DESCRIPTION OF THE INVENTION

It should be appreciated and understood by one of ordinary skill in the art that the discussion herein applies to characters and sequences of characters, which, when combined make a linguistic object or part of an object. A typical example is a character in any language, such as a letter, digit, punctuation mark, or any other symbol from a language. A typical example of an object or part of an object is a word or part of a word. However, the discussion herein equally applies to elements of other alphabetic, ideographic, and phonetic systems such as Chinese zhuyin, Japanese kana, and Korean jamos. Also, it should be noted that the objects do not have to be linguistic, because the disambiguating system claimed herein can be used to look up icons, phone numbers, or inventory records, as long as a type of symbolic string representation is present. Therefore, it should be appreciated that use of terms, such as letter, word, word stem, and the like is not limited only to those applications, and they are used to facilitate ease of reading and understanding the discussion herein.

When text is entered using a disambiguating text input system, the display often changes with each keystroke such as, for example, initially showing all possible ambiguities and further showing the ongoing convergence to a less ambiguous or even non-ambiguous solution, as illustrated in FIGS. 1 through 4 described in further detail below. In FIGS. 1 through 4, as multiple keys are entered consecutively and a word or words is converged upon, the displayed ambiguous character set for each key may decrease or dissipate.

As illustrated in FIG. 1, the display screen 700 includes an application text entry field 701, which displays for the user an inline default word choice 704, such as, for example, a default word construct, an ambiguity field 702, which displays a visual indication of character ambiguity, and a word choice list field 703, which displays word construct combinations formed upon depression of various keys.

Figure 1A:
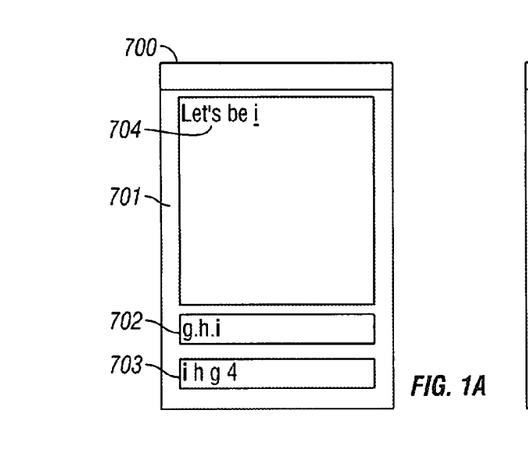

For example, as shown in FIG. 1, if a user depresses the "4" key, corresponding characters "g", "h", and "i" are displayed horizontally in the ambiguity field 702 of the succession screen FIG. 1A. In one embodiment, the most likely candidate in the set of ambiguous characters such as, for example, the "i" character is highlighted in bold. Alternatively, all characters may be displayed identically. Similarly, the most likely candidate in the set of word choices displayed in the word choice list field 703 may also be displayed in bold.

Figure 1B:
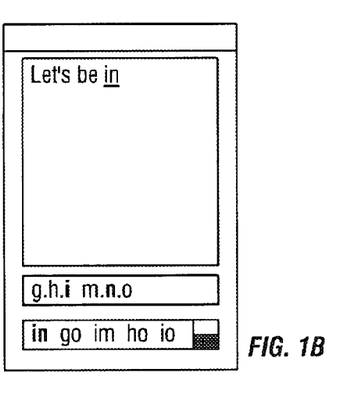
Figure 1C:
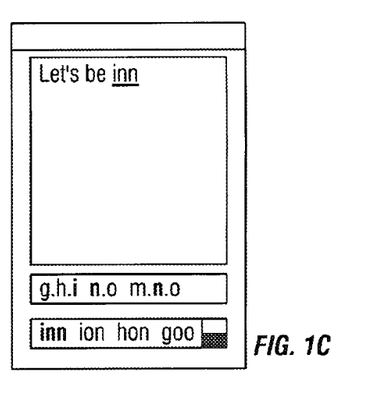
Figure 1D:
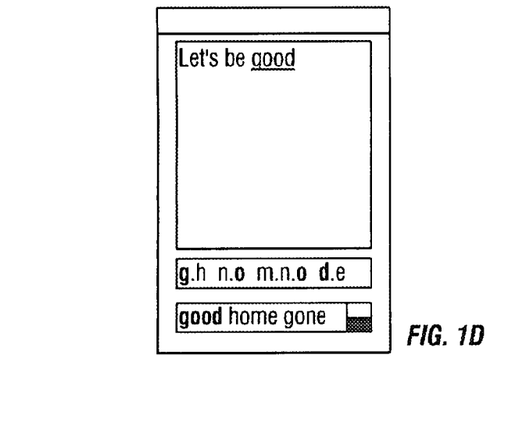
Figure 1E:
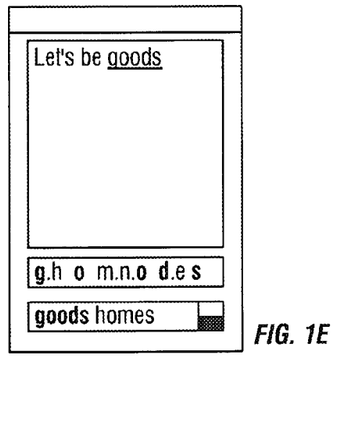
Figure 1F:
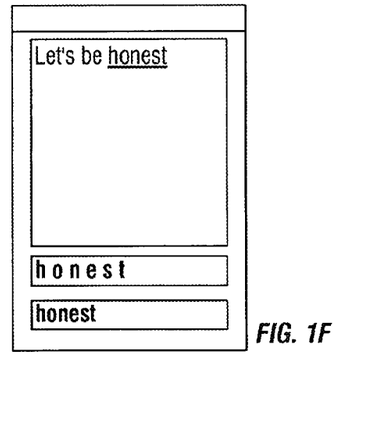
Figure 2A:
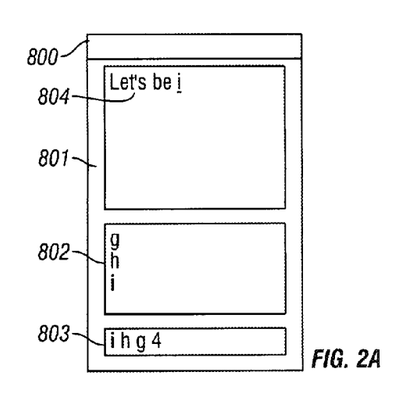
Figure 2B:
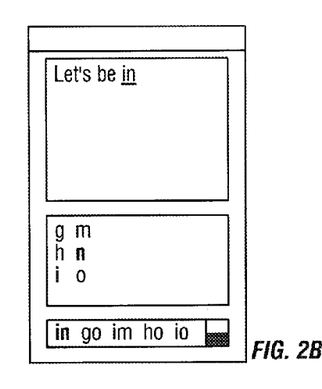
Figure 2C:
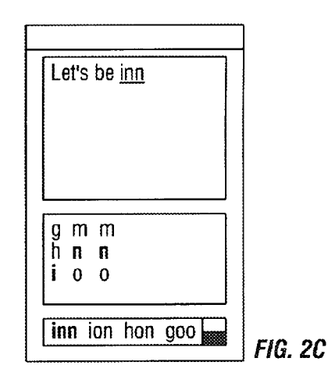
Figure 2D:
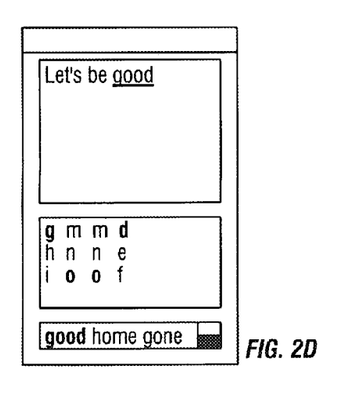
Figure 2E:
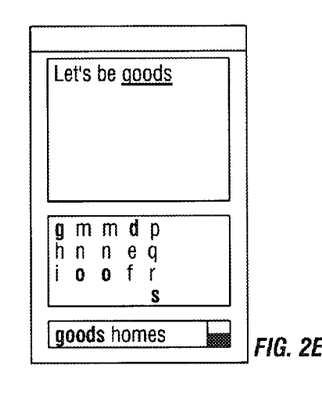
Figure 2F:
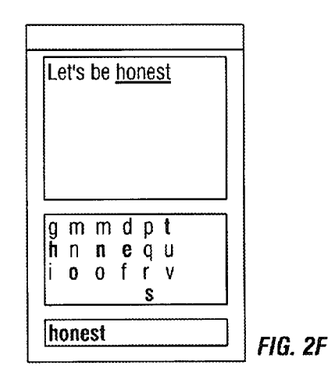
Figure 3A:
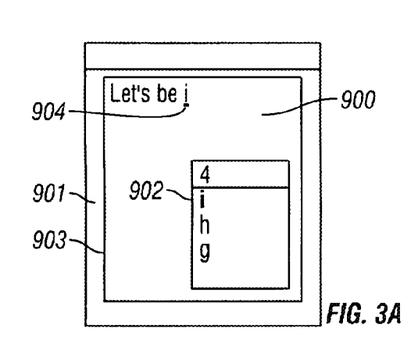
Figure 3B:
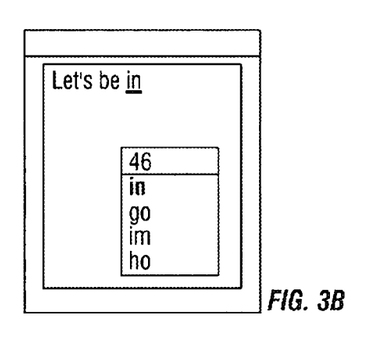
Figure 3C:
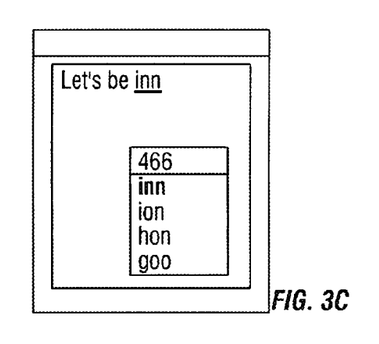
Figure 3D:
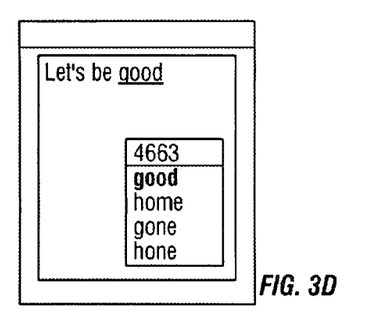
Figure 3E:
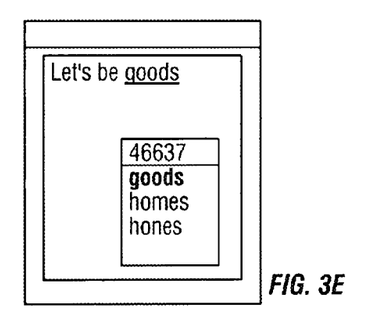
Figure 3F:
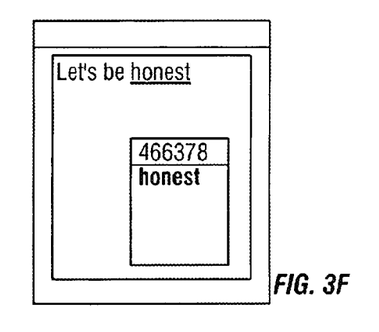
Figure 4A:
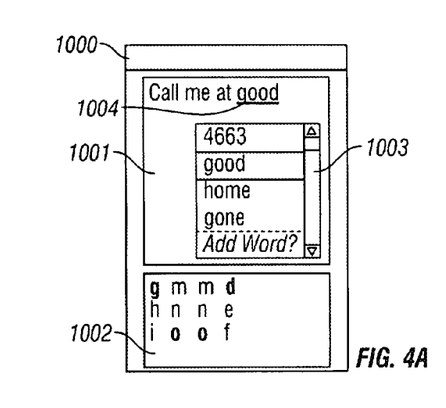
Figure 4B:
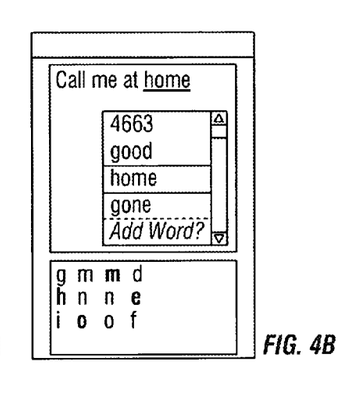
Figure 4C:
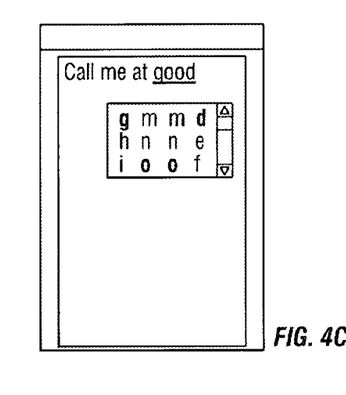
Figure 4D:
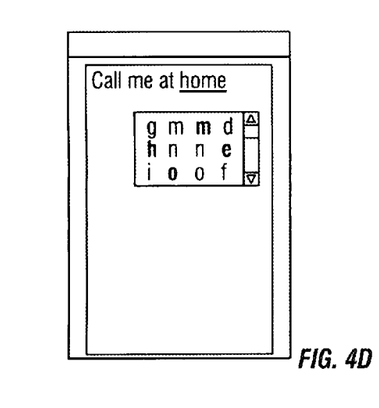
Figure 4E:
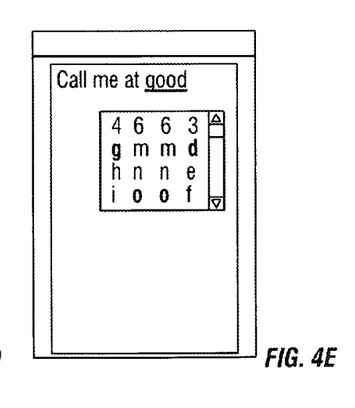
Figure 4F:
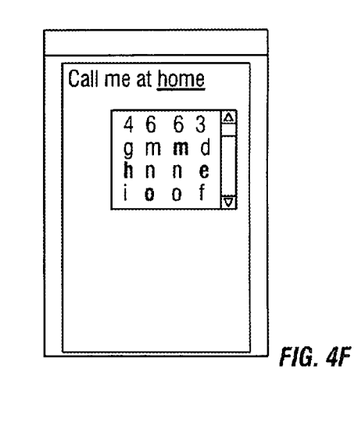
Figure 5A:
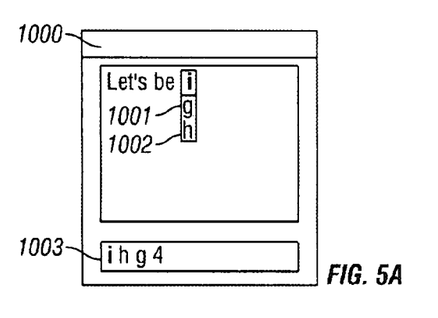
Figure 5B:
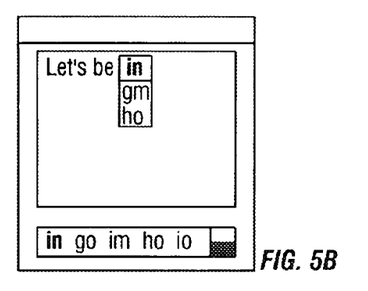
Figure 5C:
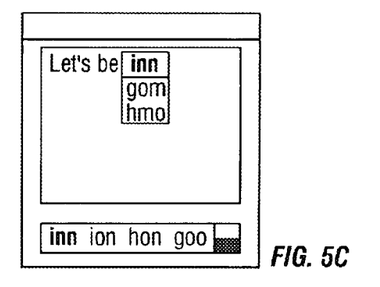
Figure 5D:
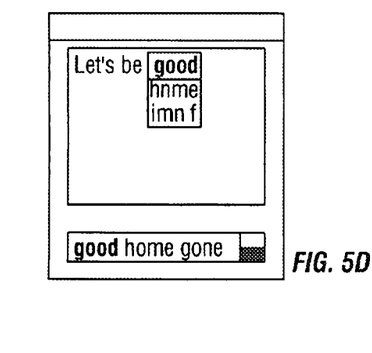
Figure 5E:
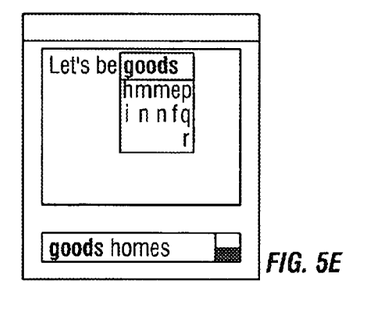
Figure 5F:
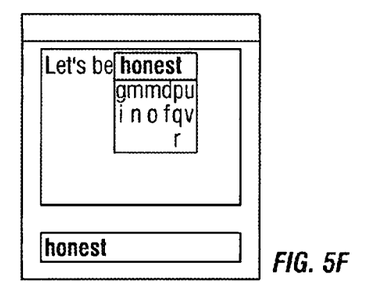
Figure 6A:
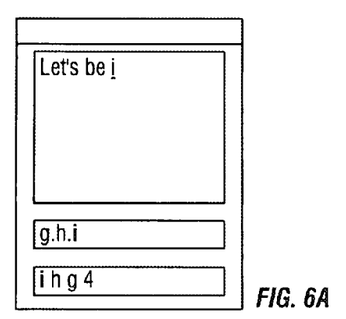
Figure 6B:
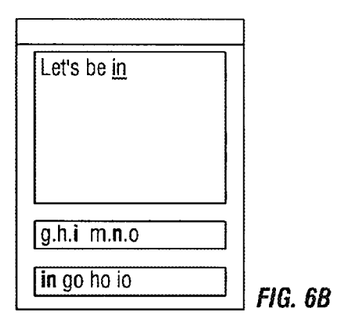
Figure 6C:
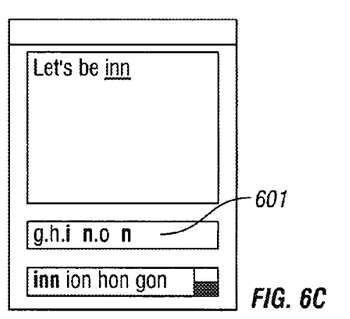
Figure 6D:
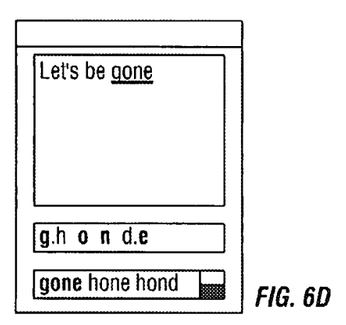
Figure 6E:
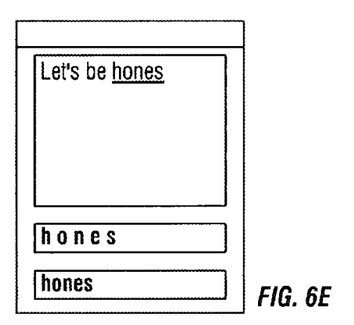
Figure 6F:
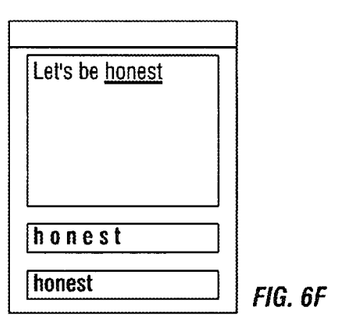

Next, if the user depresses the "6" key, corresponding characters "m", "n", "o" are displayed horizontally in the field 702, following the previously displayed characters "g", "h", and "i", and word choices formed as a result of the successive depression of the "4" and "6" keys are displayed in field 703 of the succession screen FIG. 1B. With another subsequent depression of the "6" key, the previous ambiguous sets of characters are updated and the ambiguity begins to decrease, as shown in succession screen FIG. 1C. In this case, the "m" character introduced by the first depression of the "6" key is dropped, because no valid word combinations may be found having the "m" character in the second position, as displayed in the word choice list field 703. As additional keys are pressed, potential letters are subsequently removed in screens FIGS. 1D-1F and the inline default word choice displayed in field 701 becomes identical with the remaining word choice displayed in field 703 (in this case, the word "honest").

In the alternate embodiment illustrated in FIG. 2, the display screen 800 includes an application text entry field 801, which displays for the user an inline default word choice 804, such as, for example, the currently selected word construct, an ambiguity field 802, which displays a visual indication of character ambiguity, and a word choice list field 803, which displays word combinations formed upon depression of various keys. In FIGS. 2A-2F, the ambiguous sets of characters displayed in field 802 are displayed vertically, creating a matrix of characters. In one embodiment, the letters of the most likely or selected candidate in each set of ambiguous characters is highlighted, for example in bold, whereas the invalid characters remain but are shown in a lighter shade than the other characters to indicate that they are no longer part of any word construct. Some other font attribute such as strike-out may be used instead.

In the alternate embodiment illustrated in FIG. 3, the display screen 900 includes an application text entry field 901, which displays for the user an inline default word choice 904 such as, for example, the selected word construct, and a word choice list field 902, which displays the depressed succession of keys and word combinations formed upon depression of various keys. In FIGS. 3A-3F, the sets of ambiguous characters displayed in field 902 are displayed vertically under the corresponding numeral associated with each key. The visual indication of character ambiguity is displayed in the vertical columns housing each set of ambiguous characters. In one embodiment, the most likely candidate in each set of ambiguous characters is highlighted, for example in bold, and the word choices are ordered with the most likely choice at the top of the list.

FIGS. 4A-4F illustrates alternate embodiments of screens 1000, which include an application text entry field 1001, which displays for the user an inline default word choice 1004, such as, for example, the selected word construct, an ambiguity field 1002, which displays a visual indication of character ambiguity, and a word choice list field 1003, which displays word combinations formed upon depression of various keys. In FIGS. 5A-5F, the ambiguous sets of characters displayed in field 1002 are also displayed vertically, but create an ordered matrix of characters such that the letters across the top line spell out the selected word choice and the other letters in each set fall below them. In one embodiment, one character in each set of ambiguous characters is highlighted, for example in bold, representing the spelling of the most likely or selected word candidate, whereas other possible characters are shown in normal text. Optionally, unused characters are either removed or shown in a lighter shade at the bottom of each set.

In one embodiment, the word choice list field 1003 is a scrolling field, which facilitates selection of a most likely word choice and enables the user to scroll up or down through the word choice list. The ambiguity field is updated as the user scrolls through the word choice list, to reflect the sequence of characters in the highlighted word choice.

In alternate embodiments, the ambiguity field 1002 may be displayed within or layered above the application text entry field 1001, or without the word choice list field displayed, and may include the sequence of numerals associated with each key depressed by the user.

U.S. patent application Ser. No. 10/176,933, which application is incorporated herein its entirety by this reference thereto, relates to a method and apparatus for explicit character filtering in ambiguous text entry. The invention provides embodiments including various explicit character selection techniques, such as 2-key and long-pressing, and means for matching words in a database using various methodologies.

Because explicit entry of characters reduces the ambiguity of an ambiguous key sequence, the effect can be reflected in the ambiguity field as shown in FIG. 6. Rather than showing three or more characters for a keypress, the single explicitly-entered character can be shown, communicating the reduction in ambiguity to the user. In addition, the ambiguity of the other keys in the key sequence is likely to be reduced as the explicitly-entered character is used by the system to filter out all of the non-matching word candidates. The single character may be highlighted, for example in bold, to indicate that each word candidate contains that character in the corresponding position, and/or highlighted in a distinct way to indicate that it has been explicitly entered.

In the sequence illustrated in FIGS. 6A-6F, for example, the third character in the sequence, 'n', is entered explicitly instead of ambiguously. Only that character is indicated for the third keypress 601. And because only word choices that match 'n' in the third position are included, e.g. excluding the word "good", the other ambiguous keypresses are reduced more quickly to one valid character per key compared with the same sequence in FIG. 1.

In one embodiment of the invention, the user is able to interact directly with the ambiguity field and select the desired character from each set of ambiguous characters. For example, on a touch-screen displaying the embodiment in FIG. 2 the user may tap on the desired letter within each set. On a device with a 5-way navigation key displaying the embodiment in FIG. 5, the user may move a character cursor to indicate and select a specific letter below each letter in the default word.

This becomes another means of explicitly entering a character. The system may offer a means to switch to a temporary mode for this explicit character entry. Depending on the letter chosen and the ambiguity of the matching word choices, the remaining ambiguity may be reduced significantly. For example, if at the step of FIG. 1E the user explicitly selects the letter 'n' for the third character, the result would be the same as that shown at the step of FIG. 6E.

In another embodiment, the system determines which keypress of the current sequence is the most ambiguous, which may be defined as which explicit entry would most reduce the number of word choices, or based on the weighted frequency of the words and stems beginning with the sequence. The highlighted candidate character, or the entire ambiguous set, is marked with a different color or font attribute. Alternatively, the system may present the most ambiguous set in a list from which the user may select, automatically or upon a user action. This helps the user learn and appreciate when it may be beneficial to use an explicit method during entry. In another embodiment, each set of ambiguous characters is color-graded to indicate the characters' relative ambiguities.

For instance, if the user enters the sequence corresponding to "466" and the matching words/stems are:

inn ion hon imo hmm goo hom gon hoo inm ino imn, the system determines that the third keypress is particularly ambiguous based on frequency calculations, etc. T9 shows the letter in red and a designated key or keys, e.g., the left/right arrows, can be used to cycle through "n", "o", and "m".

Then, if the user selects "n", the list changes to:

inn ion hon hon imn.

When the user subsequently presses the "3" key, only:

gone hone inne hond are shown.

In a further embodiment, the user may temporarily connect an external keyboard to the device, e.g. via a Bluetooth wireless connection, and type the specific letter for each of one or more selected ambiguous inputs or complete the current word using only unambiguous inputs. The system may switch to a temporary mode for explicit character entry automatically when an external keyboard is detected. The reduction in ambiguity from any such inputs would again be reflected in the ambiguity field.

Some languages and key layouts may assign more characters per key than the device can display for each keypress, so a modified presentation of the ambiguity field must be used. In one embodiment, the characters on each key are sorted, first by those which are valid and second by frequency of use, and a predetermined number of them are displayed. In another embodiment, the character class, vowel group, or diacritic marks are indicated generically so that each need not be shown separately. With the horizontal format in FIG. 1, however, it is possible to show a larger number of characters in each set for the first few keystrokes.

In another embodiment of the invention the ambiguity is only partially reduced by explicit entry. For example, after the user presses the "3" key on a phone that supports multiple European languages the system may display the set of characters "d", "e", "f", "é", "è", and "ë" in the ambiguity field. If, through a means as described above, the user explicitly enters an 'e' but does not have the means or desire to specify the accent, the system reduces the ambiguous set displayed for that input to "e", "é", "è", and "ë". The remaining ambiguity based on the matching word choices may still be reduced significantly, which is reflected in a reduction in ambiguity among the other inputs shown in the ambiguity field.

Figure 7A:
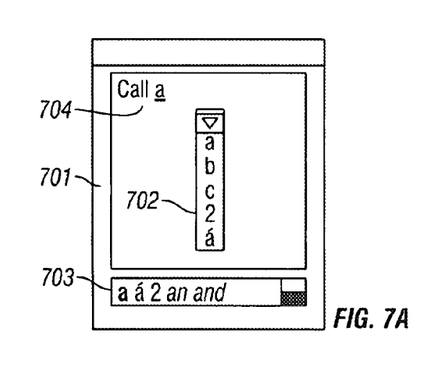
Figure 7B:
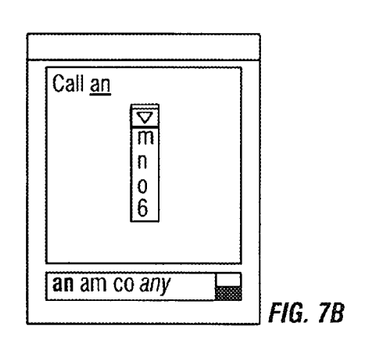
Figure 7C:
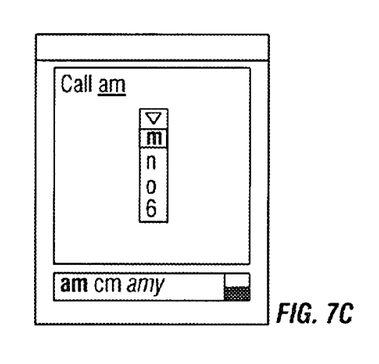
Figure 7D:
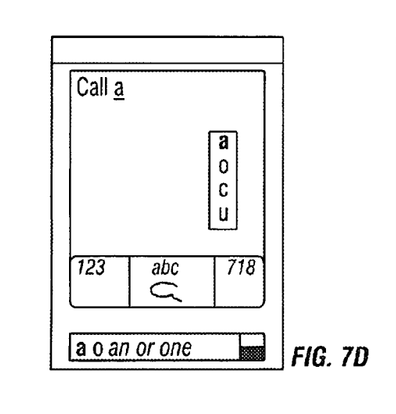
Figure 7E:
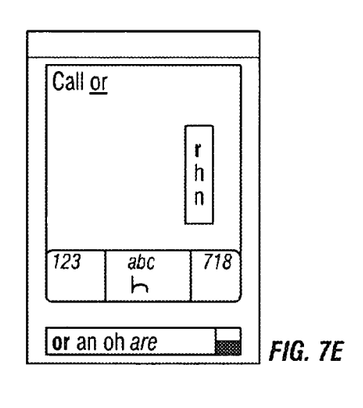
Figure 7F:
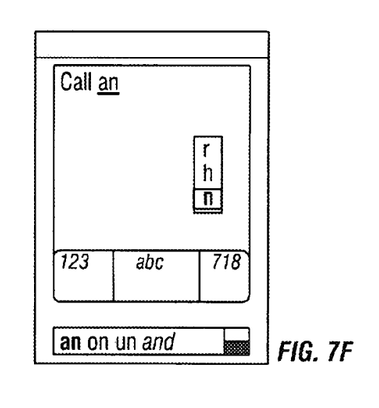

FIGS. 7A-7F illustrate an alternative embodiment of the visual ambiguity field, where the ambiguity of only one input, typically the last one entered, is shown. In this case, the ambiguity field may appear immediately, after a user pause or timed delay, or upon a designated input action. FIG. 7A shows some or all of the characters associated with the 2 key, including at least one accented letter. As before, the user may have a designated input action, such as the down-arrow key, to explicitly select one of the characters rather than allow the best character choice for the default word. For example, in FIG. 7C the down-arrow key has been pressed to explicitly select the "m," resulting in the display of only words, stems, and/or word completions with an "m" in the second position. Repeating the steps of choosing a key and then explicitly selecting one character from the key allows a novel character sequence to be typed and, optionally, added to the system's vocabulary. The system may also offer a means to select a previously entered character and redisplay the other character choices within the ambiguity field.

As further illustrated in FIG. 7, this embodiment of the ambiguity field supports other technologies such as handwriting, body gesture, and speech recognition and auto-correcting keyboards. The ambiguity field gives feedback as to how the system is interpreting the user's input, for example highlighting the most likely interpretation while listing other possible interpretations, and allowing the user to explicitly select the correct interpretation if desired. FIGS. 7D and 7E display handwritten input and the returned N-best list for each gesture. FIG. 7F shows the effect of the user tapping on the desired letter "n," and its effect on the word choices displayed. In another embodiment, the highlighted character in the ambiguity field is constrained by the available vocabulary and corresponds to a letter of the most likely word rather than being the most likely character interpretation in its N-best list.

Although the invention is described herein with reference to the preferred embodiment, one skilled in the art will readily appreciate that other applications may be substituted for those set forth herein without departing from the spirit and scope of the present invention.

Accordingly, the invention should only be limited by the Claims included below.

The invention claimed is:

1. A method, comprising the steps of:
   accepting the entry of a key input sequence by a user in a wireless communication device having a reduced keyboard and a display, wherein said reduced keyboard comprises character keys, navigational keys, and at least one selection key, wherein at least one character key corresponds to a plurality of characters;
   presenting a graphical user interface to a user comprising at least three discrete fields including each of:
      a text entry field;
      a character ambiguity field; and
      a word choice list field;
   simultaneously displaying, during all aspects of text entry, at least one user-selected word construct in said text entry field, candidate characters in said character ambiguity field, and candidate word constructs in said word choice list field, said simultaneously displaying further comprising:
      displaying candidate characters in said character ambiguity field in response to pressing of one or more keys by said user, such that entry of the at least one key with more than one character results in an ambiguous key entry, wherein said character ambiguity field displays more than one potential disambiguation of each said ambiguous key entry in said key input sequence;
      displaying, in the word choice list field, a plurality of candidate word constructs matching at least one word-level disambiguation of said key input sequence, wherein said candidate word construct comprises at least one candidate character;
      emphasizing candidate characters that builds the most likely candidate word construct in said character ambiguity field, wherein said most likely word construct is the most frequently used word construct;
   interpreting a pause of a given length after said display of said more than one potential disambiguation of the most recent ambiguous key entry in said key input sequence as an indication of said user's intention to enter a character explicitly at the current position in said sequence;
   displaying, after said pause, an interactive explicit candidate selection menu within said character ambiguity field, said explicit candidate selection menu containing all of the potential disambiguations of said most recent ambiguous key entry and a selection indicator associated with one of said potential disambiguations;
   receiving a selection of an explicit candidate via said interactive explicit candidate selection menu;
   truncating said plurality of candidate word constructs based on an explicit character selection at said position in said sequence;
   accepting navigational instructions by said user pressing at least one navigational key, wherein said navigational instructions moves said selection indicator to a different potential disambiguation in said explicit candidate selection menu;
   accepting a selection instruction by said user pressing said at least one selection key, wherein said selection instruction indicates the explicit command to input the potential disambiguation associated with said selection indicator at that time, said selected potential disambiguation taking the form of an explicitly entered character in a particular position with a word construct;

receiving instructions from said user indicating selection of one word construct from among the plurality of candidate word constructs having said explicitly entered character in a particular position, wherein all of said candidate characters remain visible to said user in said character ambiguity field until said user indication, thereby enabling said user to view alternative disambiguations of said key input sequence; and displaying said selected word construct in said text entry field.

2. The method of claim 1, further comprising:

facilitating removal or deemphasis of one or more candidate characters, said one or more candidate characters being removed or deemphasized as not part of a candidate word construct.

3. The method of claim 1, further comprising the step of:

in response to a user explicitly selecting a candidate character, facilitating display of only candidate word constructs matching said explicitly selected character in the corresponding position of the key sequence of each word construct.

4. An apparatus, comprising:
a reduced keyboard comprising:
  a plurality of character keys, each key corresponding to a plurality of characters, wherein said character keys are for accepting the entry of a key input sequence by a user;
  a plurality of navigational keys; and
  at least one selection key;
a display for displaying a graphical user interface comprising at least three discrete fields including each of:
  a text entry field;
  a character ambiguity field; and
  a word choice list field;
a processor operatively coupled with a memory, wherein said processor is configured for simultaneously displaying, during all aspects of text entry, at least one user-selected word construct in said text entry field, candidate characters in said character ambiguity field, and candidate word constructs in said word choice list field;
wherein said processor is further configured for displaying, in the word choice list field a plurality of candidate word constructs in response to successive selection of one or more keys, wherein each key corresponds to at least one character, and wherein at least one key corresponds to a plurality of characters;
wherein said processor is further configured for displaying, in the character ambiguity field, all characters for said each key; and
wherein said processor is further configured for emphasizing candidate characters that builds the most likely word construct in said character ambiguity field, wherein said most likely word construct is the most frequently used word construct;
wherein said processor is further configured for interpreting a pause of given length after said display of said more than one potential disambiguation of the most recent ambiguous key entry in said key input sequence as an indication of said user's intention to enter a character explicitly at the current position in said sequence;
wherein the processor is further configured for displaying, after said pause, an interactive explicit candidate selection menu in said character ambiguity field, said explicit candidate selection menu containing all of the potential disambiguations of said most recent ambiguous key entry and a selection indicator associated with one of said potential disambiguations;
wherein the processor is further configured for receiving a selection of an explicit candidate via said interactive explicit candidate selection menu;
wherein the processor is further configured for truncating said plurality of candidate word constructs based on an explicit character selection at said position in said sequence;
wherein said processor is further configured for accepting navigational instructions by said user pressing at least one navigational key, wherein said navigational instructions moves said selection indicator to a different potential disambiguation in said explicit candidate selection menu;
wherein said processor is further configured for accepting a selection instruction by said user pressing said at least one selection key, wherein said selection instruction indicates the explicit command to input the potential disambiguation associated with said selection indicator at that time, said selected potential disambiguation taking the form of an explicitly entered character in a particular position with a word construct;
wherein said processor is further configured for receiving instructions from said user indicating selection of one word construct from among the plurality of candidate word constructs having said explicitly entered character in a particular position, wherein all of said candidate characters remain visible to said user in said character ambiguity field until said user indication, thereby enabling said user to view alternative disambiguations of said key input sequence; and
wherein said processor is further configured for displaying said selected word construct in said text entry field.

5. The apparatus according to claim 4, further comprising:
means for facilitating removal of deemphasis of one or more characters of said at least one character corresponding to said each key, said characters being removed or deemphasized as not part of a candidate word construct.

6. A non-transitory computer-readable medium containing executable instructions, which, when executed in a processing system, cause said processing system to perform a method comprising the steps of:
accepting the entry of a key input sequence by a user in a wireless communication device having a reduced keyboard and a display, wherein said reduced keyboard comprises character keys, navigational keys, and at least one selection key, wherein at least one character key corresponds to a plurality of characters;
presenting a graphical user interface to a user comprising at least three discrete fields including each of:
  a text entry field;
  a character ambiguity field; and
  a word choice list field;
simultaneously displaying, during all aspects of text entry, at least one user-selected word construct in said text entry field, candidate characters in said character ambiguity field, and candidate word constructs in said word choice list field, said simultaneously displaying further comprising:
  displaying candidate characters in said character ambiguity field in response to pressing of one or more keys by said user, such that entry of the at least one key with more than one character results in an ambiguous key entry, wherein said character ambiguity field displays more than one potential disambiguation of each said ambiguous key entry in said key input sequence;

displaying, in the word choice list field, a plurality of candidate word constructs matching at least one word-level disambiguation of said key input sequence, wherein said candidate word construct comprises at least one candidate character;

emphasizing candidate characters that builds the most likely candidate word construct in bold form in said character ambiguity field, wherein said most likely word construct is the most frequently used word construct;

interpreting a pause of a given length after said display of said more than one potential disambiguation of the most recent ambiguous key entry in said key input sequence as an indication of said user's intention to enter a character explicitly at the current position in said sequence;

displaying, after said pause, an interactive explicit candidate selection menu within said character ambiguity field, said explicit candidate selection menu containing all of the potential disambiguations of said most recent ambiguous key entry and a selection indicator associated with one of said potential disambiguations;

receiving a selection of an explicit candidate via said interactive explicit candidate selection menu;

truncating said plurality of candidate word constructs based on an explicit character selection at said position in said sequence;

accepting navigational instructions by said user pressing at least one navigational key, wherein said navigational instructions moves said selection indicator to a different potential disambiguation in said explicit candidate selection menu;

accepting a selection instruction by said user pressing said at least one selection key, wherein said selection instruction indicates the explicit command to input the potential disambiguation associated with said selection indicator at that time, said selected potential disambiguation taking the form of an explicitly entered character in a particular position with a word construct;

receiving instructions from said user indicating selection of one word construct from among the plurality of candidate word constructs having said explicitly entered character in a particular position, wherein all of said candidate characters remain visible to said user in said character ambiguity field until said user indication, thereby enabling said user to view alternative disambiguations of said key input sequence; and displaying said selected word construct in said text entry field.

7. The non-transitory computer-readable medium according to claim 6, wherein simultaneously displaying candidate characters in said character ambiguity field and displaying candidate word constructs in said word choice list field, further comprises facilitating removal or dimming of characters of said at least one character corresponding to said each key which are not part of a candidate word construct.

\* \* \* \* \*